US 7,421,619 B2

(12) United States Patent
Al-Omari et al.

(10) Patent No.: US 7,421,619 B2
(45) Date of Patent: Sep. 2, 2008

(54) METHOD IN A PROCESSOR FOR PERFORMING IN-MEMORY TRACING USING EXISTING COMMUNICATION PATHS

(75) Inventors: Ra'ed Mohammad Al-Omari, Cedar Park, TX (US); Alexander Erik Mericas, Austin, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 11/055,821

(22) Filed: Feb. 11, 2005

(65) Prior Publication Data

US 2006/0184833 A1   Aug. 17, 2006

(51) Int. Cl.
 *G06F 11/00* (2006.01)
(52) U.S. Cl. ........................................................ 714/30
(58) Field of Classification Search ................... 714/30, 714/45
See application file for complete search history.

(56) References Cited

U.S. PATENT DOCUMENTS

| | | | | |
|---|---|---|---|---|
| 5,715,430 | A * | 2/1998 | Hirayama | 711/141 |
| 5,890,217 | A * | 3/1999 | Kabemoto et al. | 711/141 |
| 6,282,615 | B1 * | 8/2001 | Arimilli et al. | 711/122 |
| 6,539,500 | B1 * | 3/2003 | Kahle et al. | 714/45 |
| 6,920,521 | B2 * | 7/2005 | Arimilli et al. | 711/5 |
| 7,200,776 | B2 * | 4/2007 | Harris | 714/45 |
| 2006/0064552 | A9 * | 3/2006 | Hardage | 711/146 |
| 2007/0088983 | A1 * | 4/2007 | Riemens et al. | 714/30 |

OTHER PUBLICATIONS

Al-Omari et al., Method, Apparatus, and Computer Program Product in a Processor for Concurrently Sharing a Memory Controller Among a Tracing Process and Non-Tracing Processes Using a Programmable Variable Number of Shared Memory Write Buffers, Feb. 11, 2005.
Al-Omari et al., Method, Apparatus, and Computer Program Product in a Processor for Dynamically During Runtime Allocating Memory for In-Memory Hardware Tracing, Feb. 11, 2005.

(Continued)

*Primary Examiner*—Bryce P. Bonzo
*Assistant Examiner*—Neil D Miles
(74) *Attorney, Agent, or Firm*—Duke W. Yee; Diana R. Gerhardt; Lisa L. B. Yociss

(57) ABSTRACT

A method, apparatus, and computer program product are disclosed for performing in-memory hardware tracing in a processor using an existing system bus. The processor includes multiple processing units that are coupled together utilizing the system bus. The processing units include a memory controller that controls a system memory. Information is transmitted among the processing units utilizing the system bus. The information is formatted according to a standard system bus protocol. Hardware trace data is captured utilizing a hardware trace facility that is coupled directly to the system bus. The system bus is utilized for transmitting the hardware trace data to the memory controller for storage in the system memory. The memory controller is coupled directly to the system bus. The hardware trace data is formatted according to the standard system bus protocol for transmission via the system bus.

7 Claims, 13 Drawing Sheets

OTHER PUBLICATIONS

Al-Omari et al., Method, Apparatus, and Computer Program Product for Synchronizing Triggering of Multiple Hardware Trace Facilities Using an Existing System Bus, Feb. 11, 2005.

Al-Omari et al., Method, Apparatus, and Computer Program Product in a Processor for Balancing Hardware Trace Collection Among Different Hardware Trace Facilities, Feb. 11, 2005.

* cited by examiner

METHOD IN A PROCESSOR FOR PERFORMING IN-MEMORY TRACING USING EXISTING COMMUNICATION PATHS

CROSS-REFERENCE TO RELATED APPLICATIONS

The subject matter of the present application is related to U.S. application, Ser. No. 11/055,845, titled "Method, Apparatus, and Computer Program Product in a Processor for Concurrently Sharing a Memory Controller Among a Tracing Process and Non-Tracing Processes Using a Programmable Variable Number of Shared Memory Write Buffers", Ser. No. 11/055,977, titled "Method, Apparatus, and Computer Program Product in a Processor for Dynamically During Runtime Allocating Memory for In-Memory Hardware Tracing", Ser. No. 11/055,870, titled "Method, Apparatus, and Computer Program Product for Synchronizing Triggering of Multiple Hardware Trace Facilities Using an Existing System Bus", and Ser. No. 11/056,000, titled "Method, Apparatus, and Computer Program Product in a Processor for Balancing Hardware Trace Collection Among Different Hardware Trace Facilities", all filed on even date herewith, all assigned to the assignee thereof, and all incorporated herein by reference.

BACKGROUND OF THE INVENTION

1. Technical Field

The present invention is directed to data processing systems. More specifically, the present invention is directed to a method, apparatus, and computer program product for performing in-memory tracing using existing communication paths.

2. Description of Related Art

Making tradeoffs in the design of commercial server systems has never been simple. For large commercial systems, it may take years to grow the initial system architecture draft into the system that is ultimately shipped to the customer. During the design process, hardware technology improves, software technology evolves, and customer workloads mutate. Decisions need to be constantly evaluated and reevaluated. Solid decisions need solid base data. Servers in general and commercial servers in particular place a large demand on system and operator resources, so the opportunities to collect characterization data from them are limited.

Much of performance analysis is based on hardware-collected traces. Typically, traces provide data used to simulate system performance, to make hardware design tradeoffs, to tune software, and to characterize workloads. Hardware traces are almost operating system, application, and workload independent. This attribute makes these traces especialy well suited for characterizing the On-Demand and Virtual-Server-Hosting environments now supported on the new servers.

A symmetric multiprocessing (SMP) data processing server has multiple processors with multiple cores that are symmetric such that each processor has the same processing speed and latency. An SMP system could have multiple operating systems running on different processors, which are a logically partitioned system, or multiple operating systems running on the same processors one at a time, which is a virtual server hosting environment. Operating systems divide the work into tasks that are distributed evenly among the various cores by dispatching one or more software threads of work to each processor at a time.

A single-thread (ST) data processing system includes multiple cores that can execute only one thread at a time.

A simultaneous multi-threading (SMT) data processing system includes multiple cores that can each concurrently execute more than one thread at a time per processor. An SMT system has the ability to favor one thread over another when both threads are running on the same processor.

As computer systems migrate towards the use of sophisticated multi-stage pipelines and large SMP with SMT based systems, the ability to debug, analyze, and verify the actual hardware becomes increasingly more difficult, during development, test, and during normal operations. A hardware trace facility may be used which captures various hardware signatures within a processor as trace data for analysis. This trace data may be collected from events occurring on processor cores, busses (also called the fabric), caches, or other processing units included within the processor. The purpose of the hardware trace facility is to collect hardware traces from a trace source within the processor and then store the traces in a predefined memory location.

As used herein, the term "processor" means a central processing unit (CPU) on a single chip, e.g. a chip formed using a single piece of silicon. A processor includes one or more processor cores and other processing units such as a memory controller, cache controller, and the system memory that is coupled to the memory controller.

This captured trace data may be recorded in the hardware trace facility and/or within another memory. The term "in-memory tracing" means storing the trace data in part of the system memory that is included in the processor that is being traced.

Prior art approaches to in-memory tracing used a specialized data path between the trace facility and the memory controller. For example, FIG. 15 depicts a prior art approach to in-memory tracing in a processor 1500. A memory controller 1501 is coupled to a system memory 1502 through write buffers 1504. Other devices, such as a processor core (not shown) can communicate with memory controller 1501 through fabric bus controller/bus 1506.

A multiplexer 1508 selects either the signal from fabric bus controller/bus 1506 or the signal from trace facility 1510. When in a normal, non-tracing, processing mode, multiplexer 1508 selects the signal from fabric bus controller/bus 1506. When in a trace mode when trace facility is collecting and needs to store traces in system memory 1502, multiplexer 1508 selects the signal from trace facility 1510. Thus, as is clear from FIG. 15, in the prior art system, a choice must be made between the data from the bus or the trace data. System memory 1502 cannot be shared for storing trace data and at the same time be accessed by the bus to read or store other data. When in trace mode, system memory 1502 cannot be accessed to store or read data other than the trace data.

There are problems with the prior art method. When in a trace mode, memory controller 1501 is dedicated to trace facility 1510. While memory controller 1501 is dedicated to trace facility 1510, it is precluded from being used for any other purpose. This is a significant limitation, particularly in systems that have only one memory controller. In systems with only one memory controller, the system must be dedicated to the trace function and cannot perform any other work that would require the use of system memory 1502 when in trace mode.

In addition, the prior art system requires that in-memory tracing be completed using the system memory 1502 that is part of the processor 1500 that is being traced. The trace data captured by trace facility 1510 cannot be stored in any memory other than system memory 1502.

In addition to the limitations described above, the prior art requires that the system be booted to a trace mode instead to a normal mode when tracing is desired. In the prior art systems, the memory had to be allocated to store traces prior to the initial program load (IPL) being completed. FIG. 16 depicts a high level flow chart that illustrates booting a prior art system in a trace mode so that tracing can be performed and the trace data saved. The process starts as depicted by block 1600 and thereafter passes to block 1602 which illustrates cycling the machine's power off and then back on. Next, block 1604 depicts a determination of whether or not trace data is to be stored. If a determination is made that trace data is not be stored, the process passes to block 1606 which illustrates executing a normal IPL process and completing the booting of the machine. Thereafter, block 1608 depicts executing normal processing. The process then terminates as illustrated by block 1610.

Referring again to block 1604, if a determination is made that trace data is to be stored, the process passes to block 1612 which depicts allocating memory for storing traces. The dedicated memory will be a fixed size throughout the trace process. The size of the dedicated memory will not be able to be changed without rebooting the system and executing another IPL process.

A memory controller is dedicated to the trace process as described above. Because the memory controller is dedicated to the trace process, the rest of the processor, other than the trace facility, loses the ability to write to the memory that is controller by the dedicated memory controller.

Thereafter, block 1614 illustrates executing the IPL process to trace. This is a different IPL process than the normal IPL process executed as depicted by block 1606. For example, during the trace IPL process, multiplexers are set for tracing. Next, block 1616 depicts capturing traces. Thereafter, block 1618 illustrates a determination of whether or not tracing is finished. If a determination is made that tracing is not finished, the process passes back to block 1616. Referring again to block 1618, if a determination is made that tracing has finished, the process passes to block 1620 which illustrates a determination of whether or not to start normal processing. If a determination is made not to start normal processing, the process passes back to block 1620. If a determination is made to start normal processing, the process passes back to block 1602.

Therefore, a need exists for a method, apparatus, and computer program product for performing in-memory tracing using existing communication paths which eliminates the special purpose paths and improves trace operations.

SUMMARY OF THE INVENTION

A method, apparatus, and computer program product are disclosed for performing in-memory hardware tracing in a processor using an existing system bus. The processor includes multiple processing units that are coupled together utilizing the system bus. The processing units include a memory controller that controls a system memory. Information is transmitted among the processing units utilizing the system bus. The information is formatted according to a standard system bus protocol. Hardware trace data is captured utilizing a hardware trace facility that is coupled directly to the system bus. The system bus is utilized for transmitting the hardware trace data to the memory controller for storage in the system memory. The memory controller is coupled directly to the system bus. The hardware trace data is formatted according to the standard system bus protocol for transmission via the system bus.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
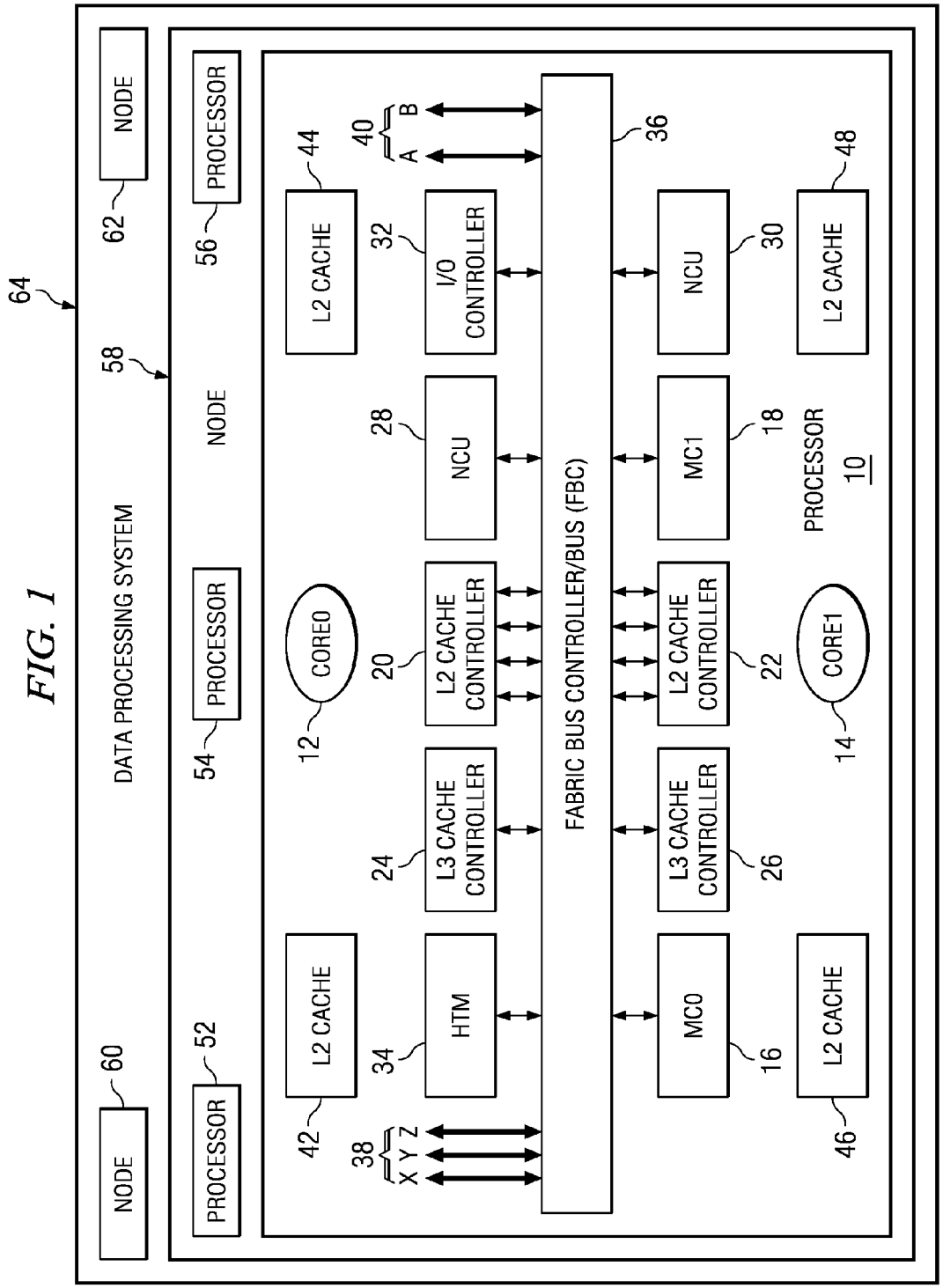
FIG. 1 is a high level block diagram of a processor that includes the present invention in accordance with the present invention.

A preferred embodiment of the present invention and its advantages are better understood by referring to the figures, like numerals being used for like and corresponding parts of the accompanying figures.

The present invention is a method, apparatus, and computer program product for performing in-memory hardware tracing using an existing system bus. A hardware trace facility is provided as one of the processing units included in a processor. The hardware trace facility is referred to herein as a hardware trace macro (HTM).

The HTM looks like any other processing unit in the processor to the fabric. It uses the same data and addressing scheme, protocols, and coherency used by the other processing units in the processor. Therefore, there is no need for extra wiring or side band signals. There is no need for a special environment for verification since it will be verified with the standard existing verification functions.

The HTM captures hardware trace data in the processor and transmits it to a system memory utilizing a system bus. The system bus, referred to herein as the fabric and/or fabric bus controller and bus, is capable of being utilized by processing units included in the processor while the hardware trace data is being transmitted to the system bus. A standard bus protocol is used by these processing units to communication with each other via the standard existing system bus.

According to the present invention, the hardware trace facility, i.e. the HTM, is coupled directly to the system bus. The memory controllers are also coupled directly to the system bus. The HTM uses this standard existing system bus to communicate with a particular memory controller in order to cause the memory controller to store hardware trace data in the system memory that is controlled by that memory controller.

The HTM transmits its hardware trace data using the system bus. The hardware trace data is formatted according to the standard bus protocol used by the system bus and the other processing units. The hardware trace data is then put out on the bus in the same manner and format used for to transmit all other information.

The memory controller(s) snoop the bus according to prior art methods.

According to the present invention, when trace data is destined for a particular memory controller, the trace data is put on the bus as bus traffic that is formatted according to the standard bus protocol. The particular memory controller is identified in this bus traffic. The memory controller will then retrieve the trace data from the bus and cause the trace data to be stored in the memory controlled by this memory controller.

In a preferred embodiment, a data processing system includes multiple nodes. Each node includes four separate processors. Each processor includes two processing cores and multiple processing units that are coupled together using a system bus. The system busses of each processor in each node are coupled together. In this manner, the processors in the various nodes can communicate with processors in other nodes via their system busses following the standard bus protocol.

One or more memory controllers are included in each processor. The memory controller that is identified by the bus traffic can be any memory controller in the system. Each memory controller controls a particular system memory. Because the standard system bus and bus protocol are used by the HTM, the trace data can be stored in the system memory in the processor which includes the HTM that captured trace data by identifying, in the bus traffic, the memory controller that controls this memory. The trace data can instead be stored in a system memory in another processor in this node or in any other node by identifying, in the bus traffic, a memory controller in another processor in this node or a memory controller in a different node.

Prior to starting a trace, the HTM will be configured to capture a particular trace. The HTM will first request that system memory be allocated to the HTM for storing the trace data it is about to collect. This memory is then allocated to the HTM for its exclusive use. The memory may be located in any system memory in the data processing system regardless of in which processor the trace data is originating.

According to the present invention, the memory controller is connected directly to the fabric bus controller. The memory controller is not coupled to the fabric bus controller through a multiplexer.

The trace facility, i.e. the hardware trace macro (HTM), is coupled directly to the fabric bus controller as if it were any other type of storage unit, e.g. an L3 cache controller, an L2 cache controller, or a non-cacheable unit. The HTM uses cast out requests to communicate with the memory controllers. A cast out request is a standard type of request that is used by the other processing units of the processor to store data in the memory. Processing units in one processor can cast out data to the system memory in that processor on to memory in other processors in this node or other processors in other nodes.

These cast out requests consist of two phases, address and data requests. These cast out requests are sent to the fabric bus controller which places them on the bus. All of the processing units that are coupled directly to the bus snoop the bus for address requests that should be processed by that processing unit. Thus, the processing units analyze each address request to determine if that processing unit is to process the request. For example, an address request may be a request for the allocation of a write buffer to write to a particular memory location. In this example, each memory controller will snoop the request and determine if it controls the system memory that includes the particular memory location. The memory controller that controls the system memory that includes the particular memory location will then get the cast out request and process it.

A cast out data request is used by the HTM to notify the fabric bus controller that the HTM trace buffer has trace data to be copied. The fabric bus controller then needs to copy the data. The fabric bus controller will use a tag, from the Dtag buffer, that includes an identification of a particular memory controller and a write buffer. The fabric bus controller then copies the data to the specific memory controller write buffer, which is identify by the tag.

Because the HTM uses cast out requests to communicate with the memory controllers, any memory controller, and thus any system memory, can be used for storing trace data. The fabric bus controller/bus transmits requests to the processing units in the processor that controls the HTM and also transmits requests to other processors in the same node as this processor and to other nodes as well. Therefore, a system memory in this processor, in another processor in this node, or in a processor in another node, can be used for storing trace data from this HTM.

FIG. 1 is a high level block diagram of a processor 10 that includes the present invention in accordance with the present invention. Processor 10 is a single integrated circuit chip. Processor 10 includes multiple processing units such as two processor cores, core 12 and core 14, a memory controller 16, a memory controller 18, an L2 cache controller 20, an L2 cache controller 22, an L3 cache controller 24, four quarters 42, 44, 46, and 48 of an L2 cache, an L3 cache controller 26, a non-cacheable unit (NCU) 28, a non-cacheable unit (NCU) 30, an I/O controller 32, a hardware trace macro (HTM) 34, and a fabric bus controller and bus 36. Communications links 38 are made to other processors, e.g. processor 52, 54, 56, inside the node, i.e. node 58, that includes processor 10. Communications links 40 are made to other processors in other nodes, such as nodes 60 and 62.

Each processor, such as processor 10, includes two cores, e.g. cores 12, 14. A node is a group of four processors. For example, processor 10, processor 52, processor 54, and processor 56 are all part of node 58. There are typically multiple nodes in a data processing system. For example, node 58, node 60, and node 62 are all included in data processing system 64. Thus, communications links 38 are used to communicate among processors 10, 52, 54, and 56. Communications links 40 are used to communicate among processors in nodes 58, 60, and 62.

Although connections are not depicted in FIG. 1, each core 12 and 14 is coupled to and can communicate with the other core and each processing unit depicted in FIG. 1 including memory controller 16, memory controller 18, L2 cache controller 20, L2 cache controller 22, L3 cache controller 24, L3 cache 26, non-cacheable unit (NCU) 28, non-cacheable unit (NCU) 30, I/O controller 32, hardware trace macro (HTM) 34, and fabric bus controller and bus 36. Each core 12 and 14 can also utilize communications links 38 and 40 to communicate with other cores and devices. Although connections are not depicted, L2 cache controllers 20 and 22 can communicate with L2 cache quarters 42, 44, 46, and 48.

Figure 2:
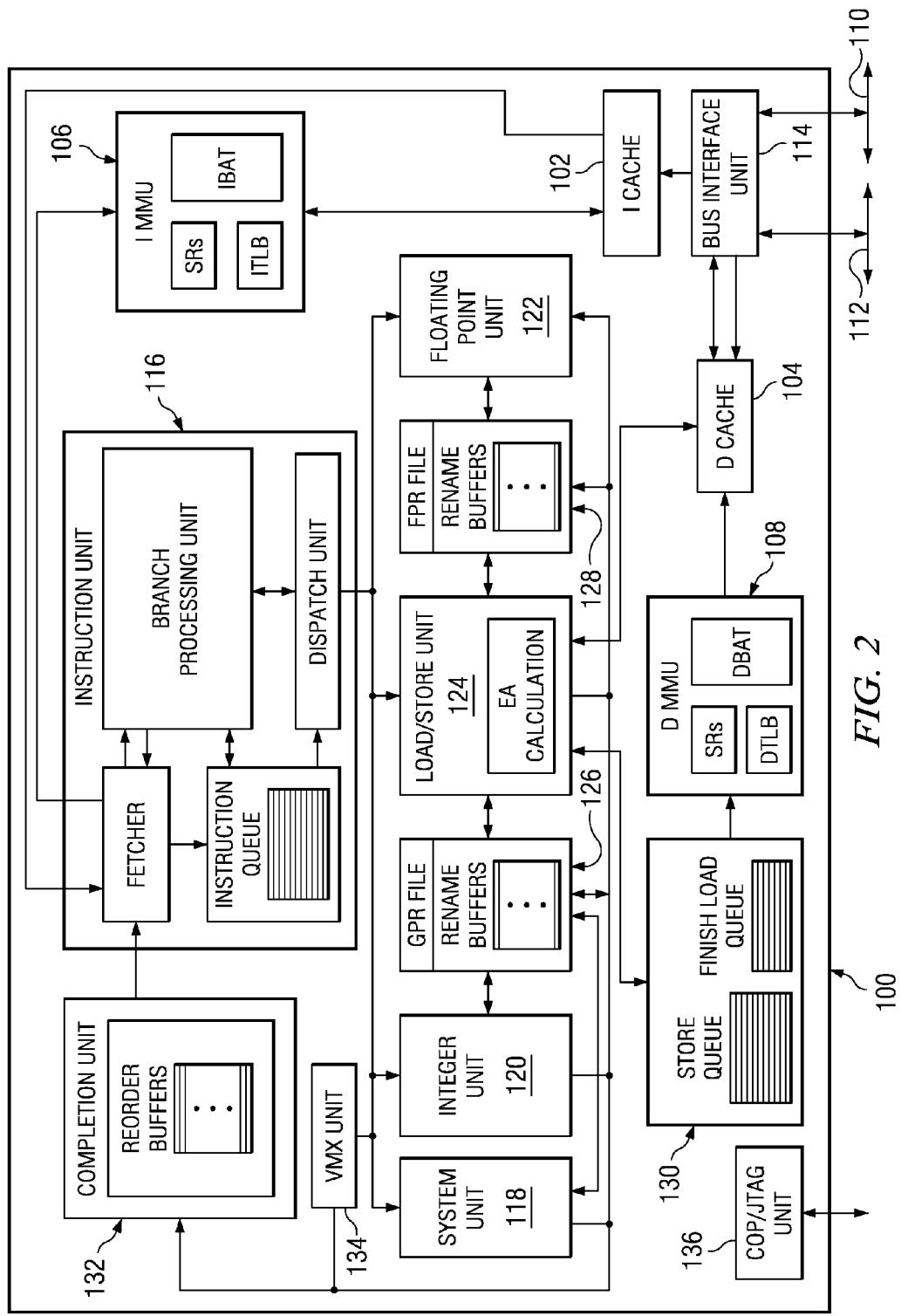
FIG. 2 is a block diagram of a processor core that is included within the processor of FIG. 1 in accordance with the present invention.

FIG. 2 depicts a block diagram of a processor core in which a preferred embodiment of the present invention may be implemented are depicted. Processor core 100 is included within processor/CPU chip 10 that is a single integrated circuit superscalar microprocessor (CPU), such as the Power-PCT™ processor available from IBM Corporation of Armonk, N.Y. Accordingly, processor core 100 includes various processing units both specialized and general, registers, buffers, memories, and other sections, all of which are formed by integrated circuitry.

Processor core 100 includes level one (L1) instruction and data caches (I Cache and D Cache) 102 and 104, respectively, each having an associated memory management unit (I MMU and D MMU) 106 and 108. As shown in FIG. 2, processor core 100 is connected to system address bus 110 and to system data bus 112 via bus interface unit 114. Instructions are retrieved from system memory (not shown) to processor core 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue, and a dispatch unit.

The dispatch unit within instruction unit 116 dispatches instructions as appropriate to execution units such as system unit 118, integer unit 120, floating point unit 122, or load/store unit 124. System unit 118 executes condition register logical, special register transfer, and other system instructions. Integer or fixed-point unit 120 performs add, subtract, multiply, divide, shift or rotate operations on integers, retrieving operands from and storing results in integer or general purpose registers (GPR File) 126. Floating point unit 122 performs single precision and/or double precision multiply/add operations, retrieving operands from and storing results in floating point registers (FPR File) 128. VMX unit 134 performs byte reordering, packing, unpacking, and shifting, vector add, multiply, average, and compare, and other operations commonly required for multimedia applications.

Load/store unit 124 loads instruction operands from data caches 104 into integer registers 126, floating point registers 128, or VMX unit 134 as needed, and stores instructions results when available from integer registers 126, floating point registers 128, or VMX unit 134 into data cache 104. Load and store queues 130 are utilized for these transfers from data cache 104 to and from integer registers 126, floating point registers 128, or VMX unit 134. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor (COP) and joint test action group (JTAG) unit 136 provides a serial interface to the system for performing boundary scan interconnect tests.

The architecture depicted in FIG. 2 is provided solely for the purpose of illustrating and explaining the present invention, and is not meant to imply any architectural limitations. Those skilled in the art will recognize that many variations are possible. Processor core 100 may include, for example, multiple integer and floating point execution units to increase processing throughput. All such variations are within the spirit and scope of the present invention.

Figure 3:
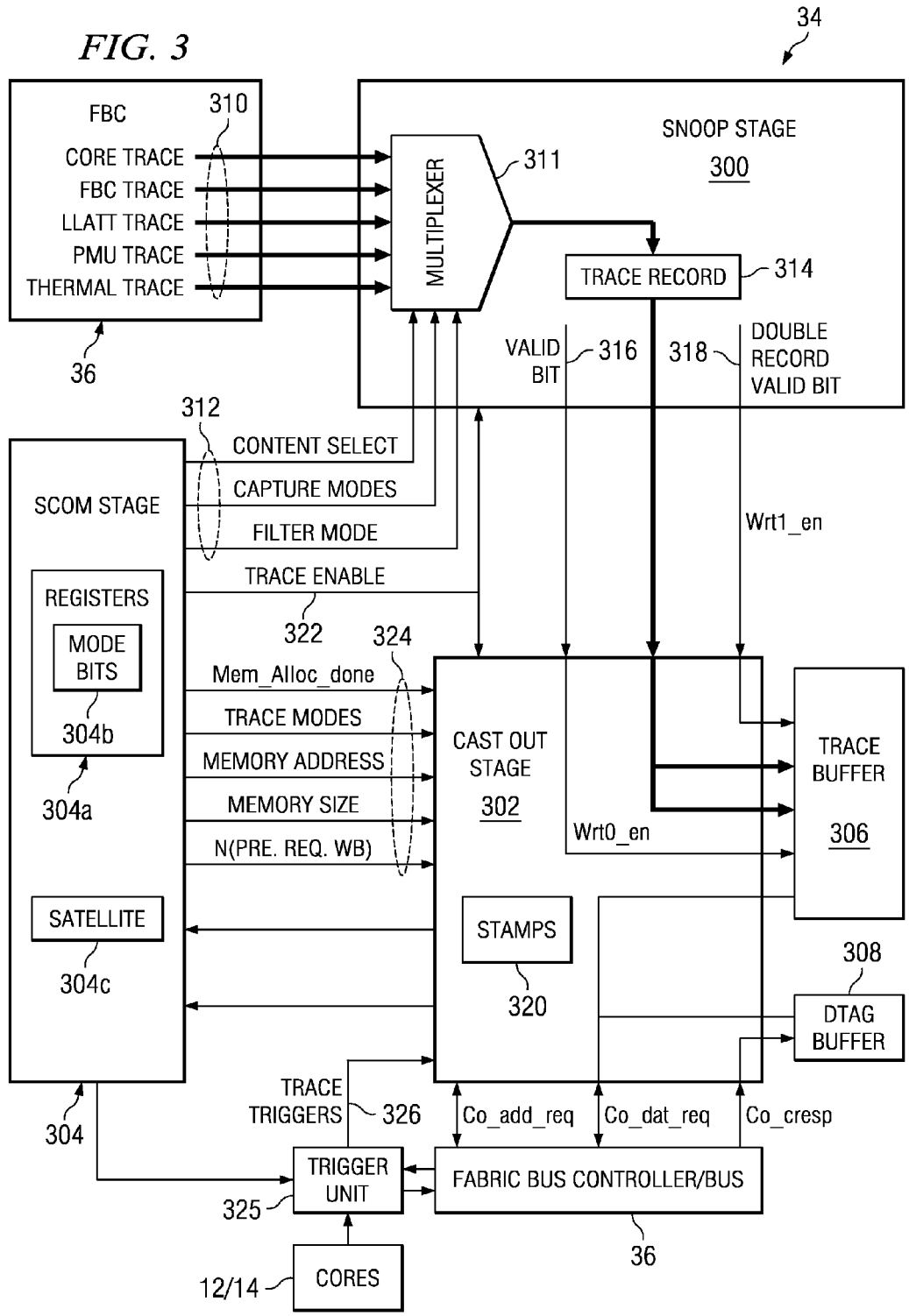
FIG. 3 is a block diagram of a hardware trace facility, such as a hardware trace macro (HTM), in accordance with the present invention.

FIG. 3 is a block diagram of a hardware trace macro (HTM) 34 in accordance with the present invention. HTM 34 includes a snoop stage 300, a trace cast out stage 302, and a scan communications (SCOM) bus stage 304. HTM 34 also includes an internal trace buffer 306 and a Dtag buffer 308.

Snoop stage 300 is used for collecting raw traces from different sources and then formatting the traces into multiple 128-bit frames. Each frame has a record valid bit and double record valid bit. The double record valid bit is used to identify if both the upper halves, e.g. bits 0-63, and the lower halves, e.g. bits 64-127, of the trace record are valid. If both bits, valid and double valid bits, are set to "1", both halves are valid. If the double valid bit is set to "0", only the upper half, i.e. bits 0-63, is valid. If both are set to "0" then none of the halves has valid data.

Snoop stage 300 snoops the traffic on fabric 36. Snoop stage 300 retrieves trace data from fabric 36 according to the filter and mode settings in HTM 34.

The trace data inputs to snoop stage 300 are the five hardware trace sources 310, select trace mode bits, capture mode bit, and filter mode bits 312. The outputs from this stage are connected to cast out stage 302. The outputs are a 128-bit trace record 314, a valid bit 316, and a double record valid bit 318.

There are five hardware trace sources: a core trace, a fabric trace, i.e. FBC trace, an LLATT trace, a PMU trace, and a thermal trace.

The core trace is an instruction trace for code streams that are running on a particular core.

The FBC trace is a fabric trace and includes all valid events, e.g. requests and responses, that occur on the fabric bus.

The LLATT trace is a trace from an L2 cache that is included within a processor. The LLATT trace includes load and store misses of the L1 cache generated by instruction streams running on a particular core.

The PMU trace is a performance monitor trace. It includes traces of events from the L3 cache, each memory controller, the fabric bus controller, and I/O controller.

The thermal trace includes thermal monitor debug bus data.

Trace cast out stage 302 is used for storing the trace record received from snoop stage 300 to one of the system memories 410, 420 or to another system memory in another processor that is either in this or another node. Trace cast out stage 302 is also responsible for inserting the proper stamps 320 into the trace data and managing trace buffer 306. Trace cast out stage 302 includes interfaces to fabric bus controller/bus 36, snoop stage 300, trace buffer 306, Dtag buffer 308, trace triggers, operation modes and memory allocation bits, and status bits.

Multiple different types of stamps are generated by stamps 320. A start stamp is created in the trace buffer whenever there is a transition from a paused state to a tracing state. This transition is detected using the start trace trigger.

When the HTM is enabled and in the run state, a mark stamp will be inserted into the trace data when a mark trigger occurs.

A freeze stamp is created and inserted into the trace data whenever the HTM receives a freeze trace trigger.

Time stamps are generated and inserted in the trace data when certain conditions occur. For example, when valid data appears after one or more idle cycles, a time stamp is created and inserted in the trace data.

SCOM stage 304 has an SCOM satellite 304c and SCOM registers 304a. SCOM satellite 304c is used for addressing the particular SCOM register. SCOM registers 304c include an HTM collection modes register, a trace memory configuration mode register, an HTM status register, and an HTM freeze address register. SCOM registers also includes mode bits 304b in which the various filter and capture modes are set.

Cast out stage 302 receives instructions for starting/stopping from processor cores 12, 14, SCOM stage 304, or global triggers through the fabric 36. SCOM stage 304 receives instructions that describe all of the information that is needed in order to perform a trace. This information includes an identification of which trace to receive, a memory address, a memory size, the number of write buffers that need to be requested, and a trace mode. This information is stored in registers 304a and mode bits 304b. This information is then provided to snoop stage 300 in order to set snoop stage 300 to collect the appropriate trace data from fabric 36.

SCOM stage 304 generates a trace enable signal 322 and signals 324.

Trace triggers 326 include a start trigger, stop trigger, pause trigger, reset trigger, freeze trigger, and an insert mark trigger. The start trigger is used for starting a trace. The stop trigger is used for stopping a trace. The pause trigger is used to pause trace collection. The reset trigger is used to reset the frozen state and reset to the top of trace buffer 306. The freeze trigger is used to freeze trace collection. The HTM will ignore all subsequent start or stop triggers while it is in a freeze state. The freeze trigger causes a freeze stamp to be inserted into the trace data. The insert mark trigger is used to insert a mark stamp into the trace data.

Trace triggers 326 originate from the trigger unit 325. Trigger unit 325 receives trigger signals from fabric 36, one of the cores 12, 14, or SCOM stage 304.

Signals 324 include a memory allocation done (mem_alloc_done) signal, trace modes signal, memory address signal, memory size signal, and a signal "N" which is the number of pre-requested write buffers.

According to the present invention, a configurable sequential address range, controlled by one or more of the memory controllers, is configured to be allocated to the trace function. This range can be statically assigned during the initial program load (IPL) or dynamically using software. Software will support allocation and relocation of physical memory on a system that has booted and is executing.

The process of allocation and relocation includes having the firmware declare a particular memory region as "defective" and then copying the current contents of the region to a new location. The contents of the region continue to be available to the system from this new location. This particular memory region is now effectively removed from the system memory and will not be used by other processes executing on the system. This particular memory region is now available to be allocated to the hardware trace macro for its exclusive use for storing hardware trace data.

To define this memory, the software that controls the HTM will write to an SCOM register using calls to the hypervisor. This SCOM register has a field that is used to define the base address and the size of the requested memory. The HTM will then wait until a Mem_Alloc_Done signal is received before it starts using the memory.

After enabling the HTM and allocating system memory in which to store trace data, the HTM will start the process of collecting trace data by selecting one of its inputs, i.e. inputs 310, to be captured. The trace routine that is controlling the HTM will define the memory beginning address, the memory size, and the maximum number of write buffers that the HTM is allowed to request before it has trace data to store.

To initiate the write buffer allocation process, the HTM will serially drive a series of cast out requests to the fabric controller bus, one for each number of write buffers that are allowed. If no write buffers are pre-allocated, the HTM will send a cast out request each time it has accumulated a cache line of data. A cache line of data is preferably 128 bytes of data.

The HTM will keep a count of the number of write buffers currently allocated to the HTM. Upon receiving a response from the fabric bus controller that a write buffer has been allocated to the HTM, the HTM will increment the count of the number of allocated buffers. This response will include routing information that identifies the particular memory controller that allocated the write buffer and the particular write buffer allocated. The HTM will save the routing information received from the fabric bus controller as a tag in Dtag buffer 308. This information will be used when the HTM generates a cast out data request that indicates that the HTM has trace data in trace buffer 306 that is ready to be stored in the system memory. If the response from the fabric bus controller indicates that a write buffer was not allocated, the HTM will retry its request.

When the HTM receives a start trace trigger, the HTM will begin collecting the trace that is selected using signals 312. Multiplexer 311 is controlled by signals 312 to select the desired trace. The trace data is then received in trace record 314 and then forwarded to trace buffer 306. At the start of the trace, prior to saving any trace data, a start stamp from stamps 320 is saved in trace buffer 306 to indicate the start of a trace.

When the HTM has collected 128 bytes of data, including trace data and any stamps that are stored, the HTM will send a cast out data request signal to the fabric bus controller if there is at least one write buffer allocated to the HTM. Otherwise, the HTM will request the allocation of a write buffer, wait for that allocation, and then send the cast out data request. Trace buffer 306 is capable of holding up to four cache lines of 128 bytes each. Once trace buffer 306 is full, it will start dropping these trace records. An 8-bit counter increments for every dropped record during this period of time that the buffer is full. If the 8-bit counter overflows, a bit is set and the counter rolls over and continues to count. When the buffer frees up, a timestamp entry is written before the next valid entry is written.

The fabric bus controller will then copy the data out of trace buffer 306 and store it in the designated write buffer. The HTM will then decrement the number of allocated write buffers.

When the HTM receives a stop trace trigger, the HTM will stop tracing.

Figure 4:
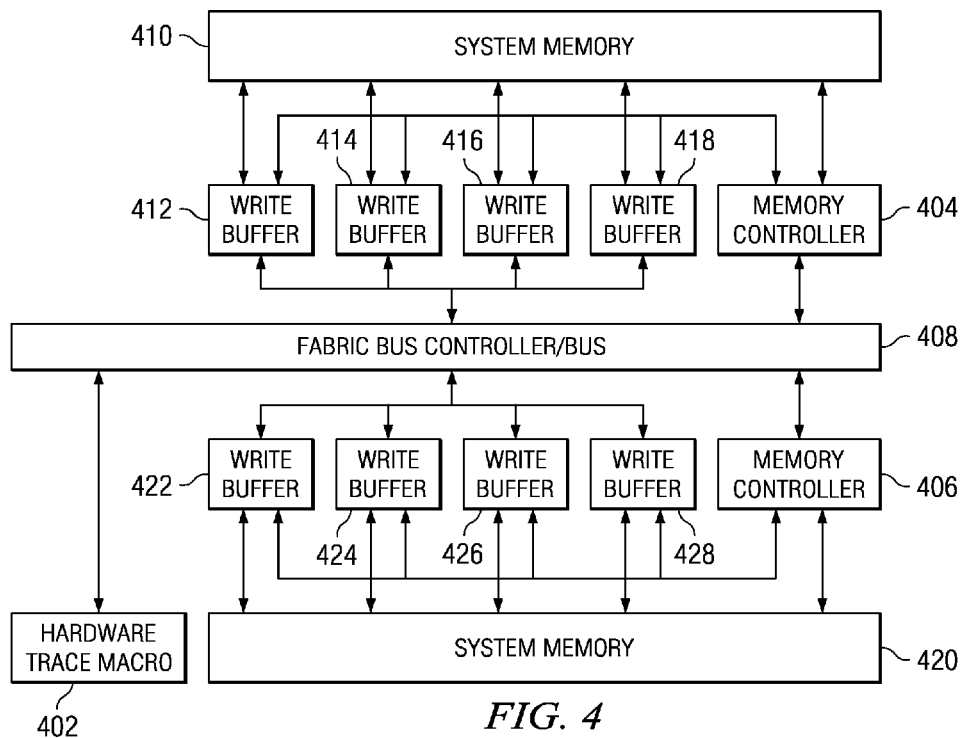
FIG. 4 is a block diagram of a portion of the memory subsystem and the hardware trace macro of the processor of FIG. 1 in accordance with the present invention.
Figure 15:
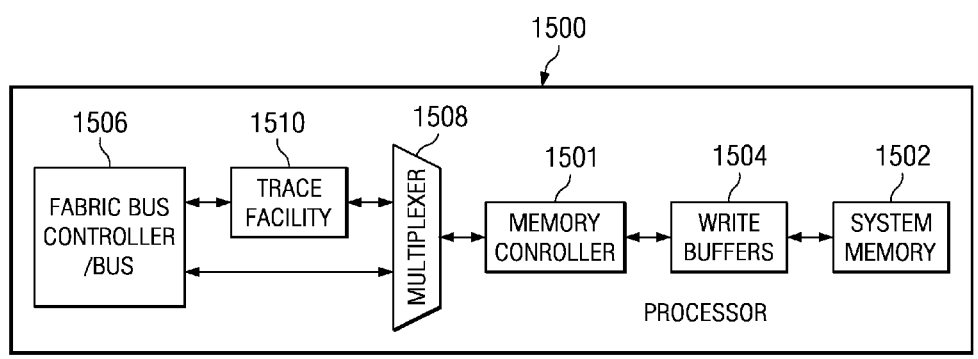
FIG. 15 depicts, in a prior art processor, in-memory tracing in accordance with the prior art.

FIG. 4 is a block diagram of a portion of the memory subsystem and the hardware trace macro of the processor of FIG. 1 in accordance with the present invention. A hardware trace macro 402, a memory controller 404, and a memory controller 406 are all coupled to a fabric bus controller and its bus 408. Memory controller 404 controls system memory 410. Data is written to memory 410 through write buffers 412, 414, 416, and 418. Memory controller 406 controls system memory 420. Data is written to memory 420 through write buffers 422, 424, 426, and 428.

Any number of write buffers may be used although only four are depicted. For example, in the preferred embodiment there are 12 write buffers for each memory controller.

As is depicted by FIG. 4, the memory controllers are connected directly to the fabric bus 408. No multiplexer is used. Therefore, even while one of the memory controllers and its write buffers and system memory are receiving and storing trace data, that memory controller, remaining available write buffers, and system memory can also be accessed by bus 408 to process other requests.

A variable number of write buffers may be allocated to a particular process. In addition, some of these write buffers may be allocated to one process while the remaining write buffers are allocated to another process. For example, three write buffers can be allocated to the HTM for storing trace data while the remaining nine write buffers are allocated to another process. The memory controller that controls these write buffers would then be responding to memory requests concurrently from the HTM and from the other process. Thus, neither the memory controller nor its write buffers are dedicated to the HTM for tracing.

Figure 5:
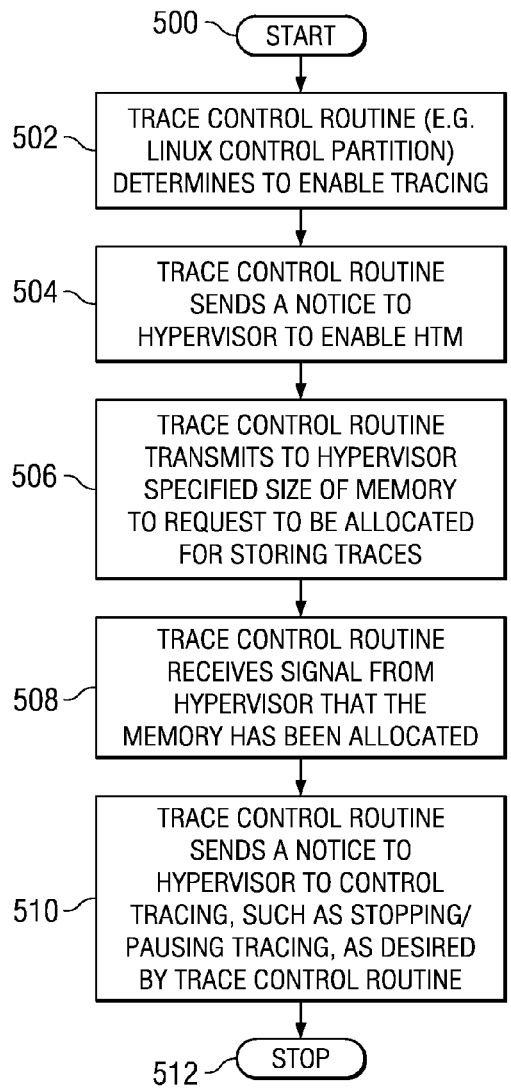
FIG. 5 illustrates a high level flow chart that depicts a trace control routine starting tracing in accordance with the present invention.

FIG. 5 illustrates a high level flow chart that depicts a trace control routine starting tracing in accordance with the present invention. The process starts as depicted by block 500 and thereafter passes to block 502 which illustrates a trace control routine, such as one being executed within a Linux partition, determining to enable tracing. The trace control program is executing after the completion of the IPL and booting of the system. Next, block 504 depicts the trace control routine sending a notice to the hypervisor telling the hypervisor to enable the HTM. The process then passes to block 506 which illustrates the trace control routine transmitting to the hypervisor a specified size of memory to request to be allocated for storing traces. Next, block 507 depicts the trace control routine receiving a signal from the hypervisor that indicates that the memory has been allocated.

Thereafter, block 508 illustrates the trace control routine sending a notice to the hypervisor to control tracing, such as by stopping, pausing, or performing another trace function as desired by the trace control program. The process then terminates as depicted by block 510.

Figure 6:
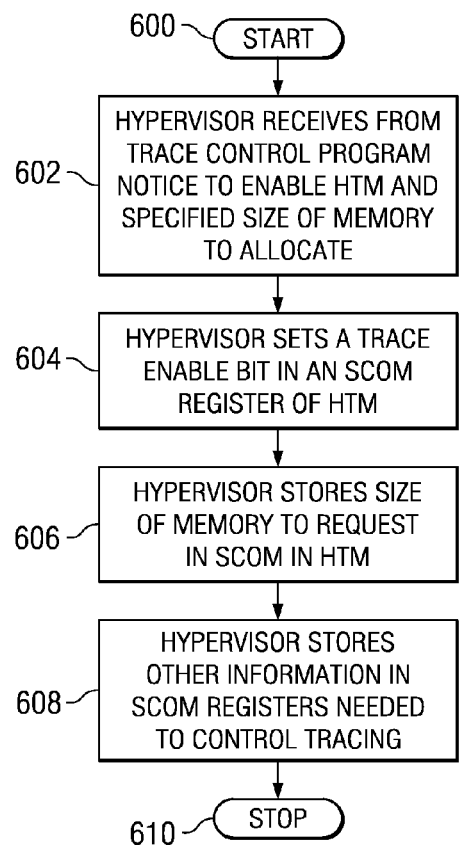
FIG. 6 illustrates a high level flow chart that depicts a hypervisor receiving a notice from a trace control routine to start tracing and setting bits, modes, and addresses in a hardware trace macro to start tracing in accordance with the present invention.

FIG. 6 illustrates a high level flow chart that depicts a hypervisor receiving a notice from a trace control routine to enable tracing and setting bits, modes, and addresses in a hardware trace macro to enable tracing in accordance with the present invention. The process starts as depicted by block 600 and thereafter passes to block 602 which illustrates the hypervisor receiving from the trace control program a notice to enable the HTM and a specified size of memory to allocate for storing trace data. Next, block 604 depicts the hypervisor setting a trace enable bit in a register in the SCOM stage in the HTM.

The process then passes to block 606 which illustrates the hypervisor storing the specified size of memory to be requested in a register in the SCOM in the HTM. Next, block 608 depicts the hypervisor storing other information in the SCOM registers that is needed to control tracing. The process then terminates as depicted by block 610.

Figure 7:
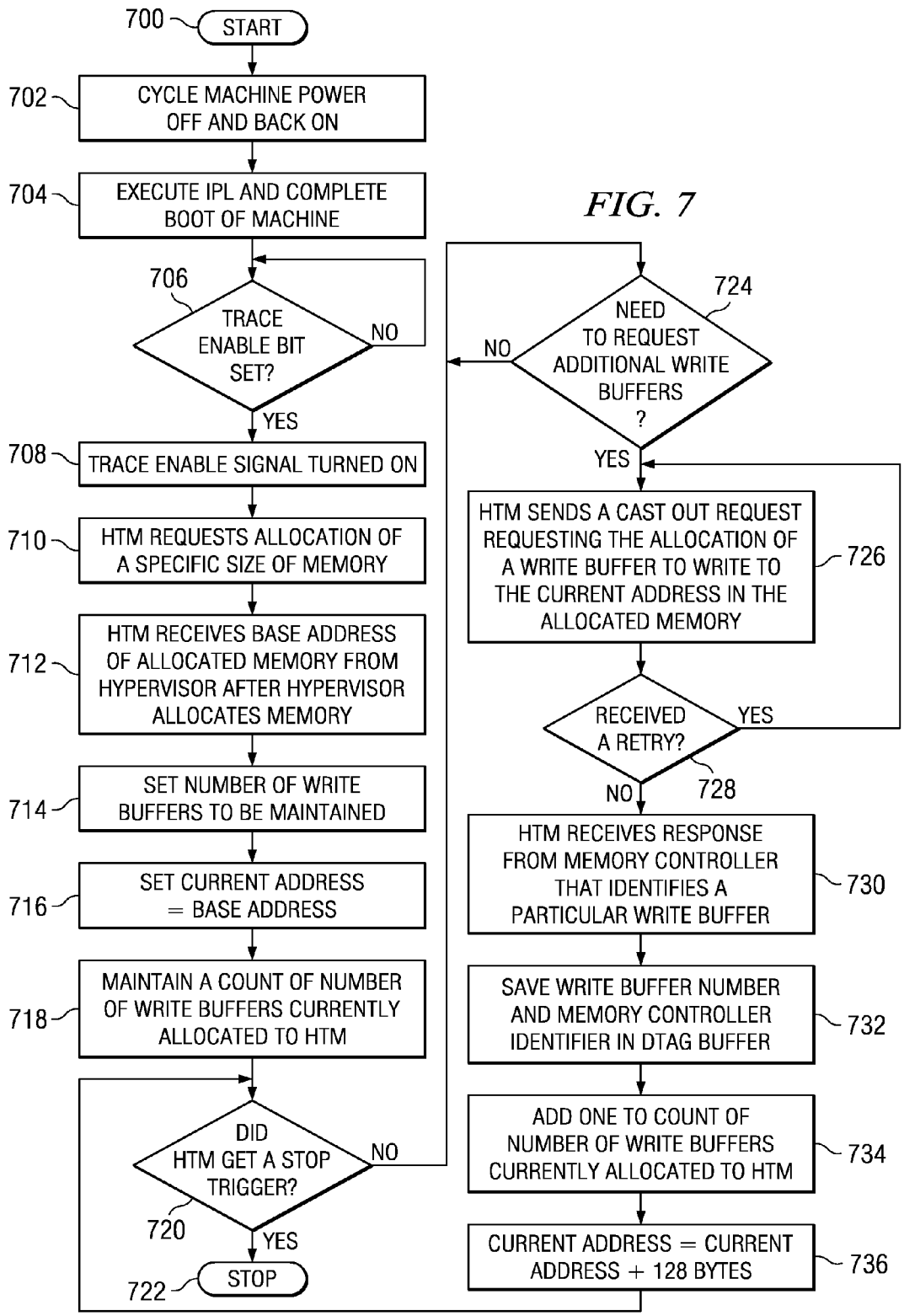
FIG. 7 illustrates a high level flow chart that depicts the hardware trace macro requesting the allocation of write buffers that will be used to transfer trace data to system memory in accordance with the present invention.

FIG. 7 illustrates a high level flow chart that depicts the hardware trace macro requesting the allocation of write buffers that will be used to transfer trace data to system memory in accordance with the present invention. The process starts as depicted by block 700 and thereafter passes to block 702 which illustrates cycling the machine, i.e. data processing system that includes this processor, power off and then back on. Next, block 704 depicts executing a normal IPL process and completing the booting of the system. At this time, the machine has been booted and an operating system is executing. Thereafter, block 706 illustrates a determination of whether or not the trace enable bit in the HTM is set. The trace enable bit in the HTM can be set at any time while the system is executing. Thus, tracing can be enabled dynamically while the system is executing without requiring that the system be rebooted. If a determination is made that the trace enable bit is not set, the process passes back to block 706. If a determination is made that the trace enable bit is set, the process passes to block 708.

Block 708, then, depicts the trace enable signal in the HTM being turned on. Next, block 710 illustrates the HTM requesting an allocation of a specific size of system memory to be used to store trace data. The HTM requests the allocation of the size of memory that is identified within registers 304a. The system memory can be anywhere in the system. The system memory can be on the same processor as the HTM, on a different processor, or in a node that is different from the node that includes the HTM.

Block 712, then, illustrates the HTM receiving a base address of the memory allocated to the HTM by the hypervisor after the hypervisor has allocated the memory. Next, block 714 depicts setting a number of write buffers to be maintained for the HTM. This is the number of write buffers that should always be allocated to the HTM. This number is stored in registers 304a. The process then passes to block 716 which illustrates setting the current address equal to the base address. Thereafter, block 718 depicts maintaining a count of the number of write buffers that are currently allocated to the HTM.

Thereafter, block 720 illustrates a determination of whether or not the HTM has received a stop trigger. If a determination is made that the HTM has received a stop trigger, the process terminates as depicted by block 722. Referring again to block 720, if a determination is made that the HTM has not received a stop trigger, the process passes to block 724 which illustrates a determination of whether or not there is a need to request additional write buffers to be allocated to the HTM. If the count of write buffers that are currently allocated to the HTM is not below the set number of write buffers to be maintained, the process passes back to block 724. In this case, the number of write buffers currently allocated to the HTM is equal to the number of write buffers (set in block 714) to be maintained.

Referring again to block 724, if the count of write buffers that are currently allocated to the HTM is below the set number of write buffers to be maintained, the process passes to block 726 which depicts the HTM sending a cast out request requesting the allocation of a write buffer to use to write to the current address in the allocated memory.

Block 728, then, illustrates a determination of whether or not the HTM has received a retry signal. If a determination is made that the HTM has received a retry signal, the process passes back to block 726. If a determination is made that the HTM has not received a retry signal, the process passes to block 730 which depicts the HTM receiving a response from the memory controller that identifies a particular write buffer. This is the write buffer that was allocated to the HTM.

Next, block 732 illustrates saving the write buffer number and a memory controller identifier, such as the memory controller number, in the Dtag buffer as a tag. Thereafter, block 734 depicts adding one to the count of the number of write buffers that are currently allocated to the HTM. Block 736, then, illustrates setting the current address equal to the current address plus 128 bytes. The process then passes back to block 720.

Figure 8:
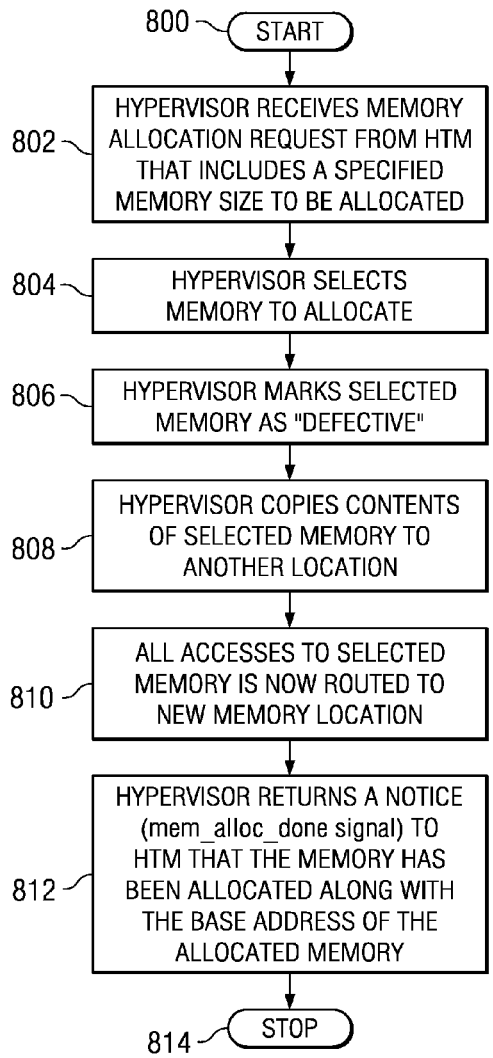
FIG. 8 depicts a high level flow chart that illustrates dynamically allocating memory for storing trace data after the system has completed booting in accordance with the present invention.

FIG. 8 depicts a high level flow chart that illustrates dynamically allocating memory for storing trace data after the system has completed booting in accordance with the present invention. The process starts as depicted by block 800 and thereafter passes to block 802 which illustrates the hypervisor receiving a memory allocation request from the HTM that includes a specified size of memory to be allocated. Next, block 804 depicts the hypervisor selecting memory to be allocated.

The process then passes to block 806 which illustrates the hypervisor marking the selected memory as "defective". Next, block 808 depicts the hypervisor copying the contents of the selected memory to another memory location. Block 810, then, illustrates all accesses to the selected memory now being routed to the new memory location. Thereafter, block 812 depicts the hypervisor returning a notice, such as a "mem_alloc_done" signal, to the HTM that the memory has been allocated. This notice also includes the base address of the allocated memory. A bit is then set in mode bits 304 to indicate that the memory has been allocated. In addition, the base address is stored in registers 304a. The process then terminates as illustrated by block 814.

Figure 9:
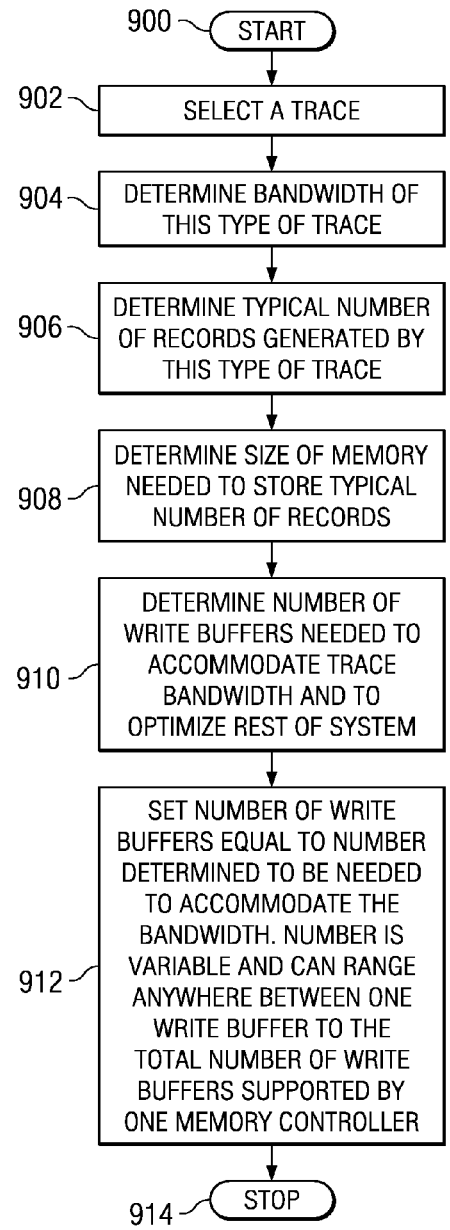
FIG. 9 illustrates a high level flow chart that depicts determining a number of write buffers to be allocated to a particular trace in accordance with the present invention.

FIG. 9 illustrates a high level flow chart that depicts determining a number of write buffers to be allocated to a particular trace in accordance with the present invention. The process starts as depicted by block 900 and thereafter passes to block 902 which illustrates selecting a trace. Next, block 904 depicts determining the typical bandwidth of this type of trace. Thereafter, block 906 illustrates determining the typical number of records that are generated by this type of trace.

Block 908, then, depicts determining the size of memory that will be needed to store the typical number of records generated by this type of trace. The process then passes to block 910 which illustrates determining the number of write buffers that will be needed to accommodate the typical trace bandwidth while optimizing the remaining processing of the system. Block 912, then, depicts setting the number of write buffers equal to the number determined as being needed to accommodate this trace bandwidth. This number is variable and can range anywhere between one write buffer to the total number of write buffers that are supported by one memory controller. In the preferred embodiment, twelve write buffers are supported by each memory controller. The process then terminates as illustrated by block 914.

Figure 10:
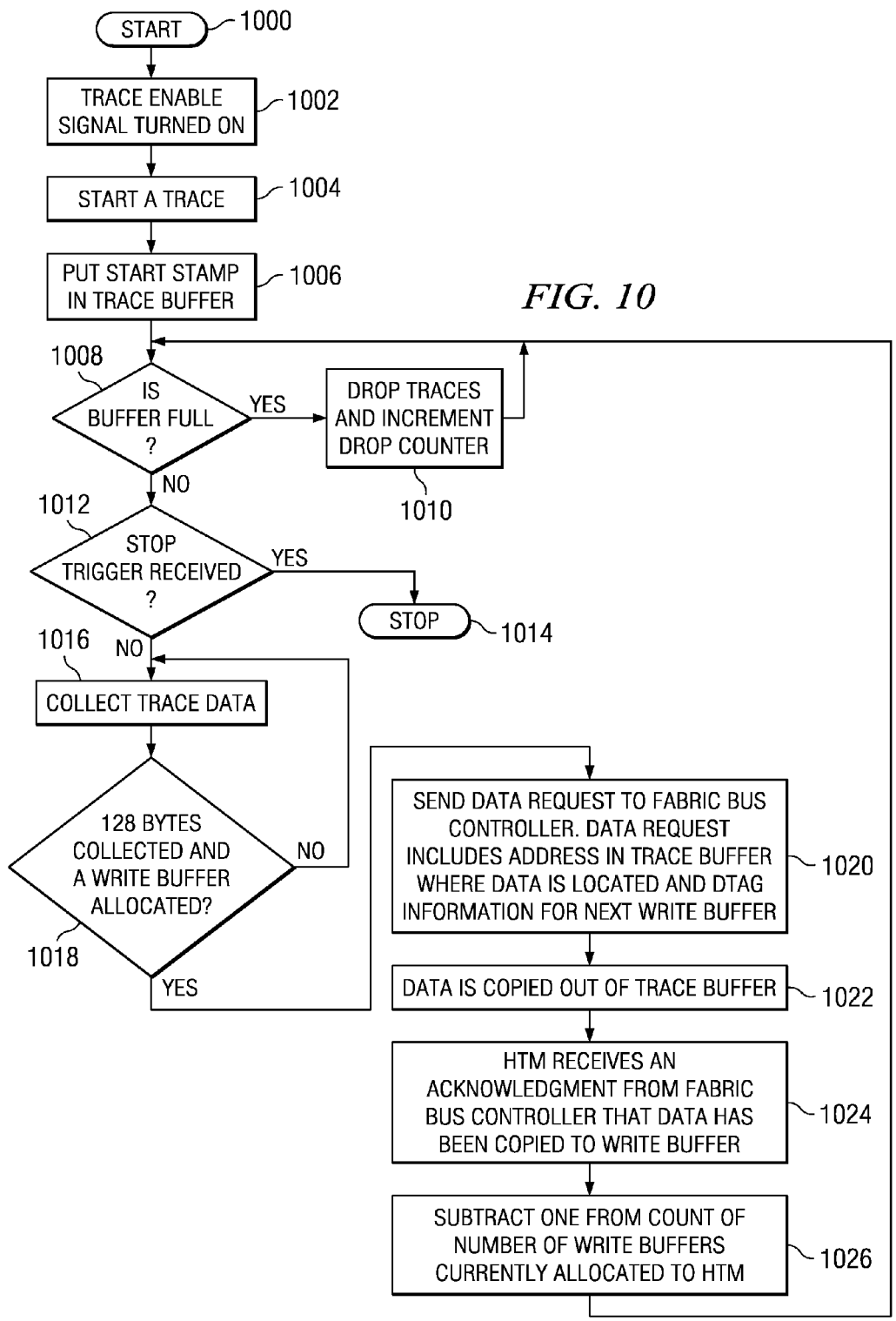
FIG. 10 depicts a high level flow chart that illustrates storing trace data in system memory in accordance with the present invention.

FIG. 10 depicts a high level flow chart that illustrates storing trace data in system memory in accordance with the present invention. The process starts as depicted by block 1000 and thereafter passes to block 1002 which illustrates turning on the trace enable signal. Next, block 1004 depicts starting a trace. The process then passes to block 1006 which illustrates putting a start stamp in the trace buffer. The start stamp indicates the beginning of a trace.

Thereafter, block 1008 depicts a determination of whether or not the buffer is full. If a determination is made that the buffer is full, the process passes to block 1010 which illustrates dropping traces and incrementing the drop counter. The process then passes back to block 1008. Referring again to block 1008, if a determination is made that the buffer is not full, the process passes to block 1012 which depicts a determination of whether or not a stop trigger has been received. If a determination is made that a stop trigger has been received, the process terminates as illustrated by block 1014. Referring again to block 1012, if a determination is made that a stop trigger has not been received, the process passes to block 1016 which depicts collecting trace data.

The process then passes to block 1018 which illustrates a determination of whether or not a cache line, e.g. 128 bytes, has been collected and a write buffer allocated. If a determination is made that either 128 bytes has not been collected yet or a write buffer has not been allocated, the process passes back to block 1016. If a determination is made that 128 bytes has been collected and a write buffer has been allocated, the process passes to block 1020 which depicts sending a cast out data request to the fabric bus controller. The cast out data request includes an address in the trace buffer where the trace data is located. The cast out data request also includes Dtag information, such as a tag, for the next write buffer. The tag includes an identifier of a memory controller, such as a memory controller number, and an identifier of a write buffer, such as a write buffer number.

Block 1022, then, depicts the data being copied out of the trace buffer. Next, block 1024 illustrates the HTM receiving an acknowledgement from the fabric bus controller that the data has been copied to the write buffer that was identified in the cast out data request. Thereafter, block 1026 depicts subtracting one from the count of the number of write buffers that are currently allocated to the HTM. The process then passes back to block 1008.

Figure 11:
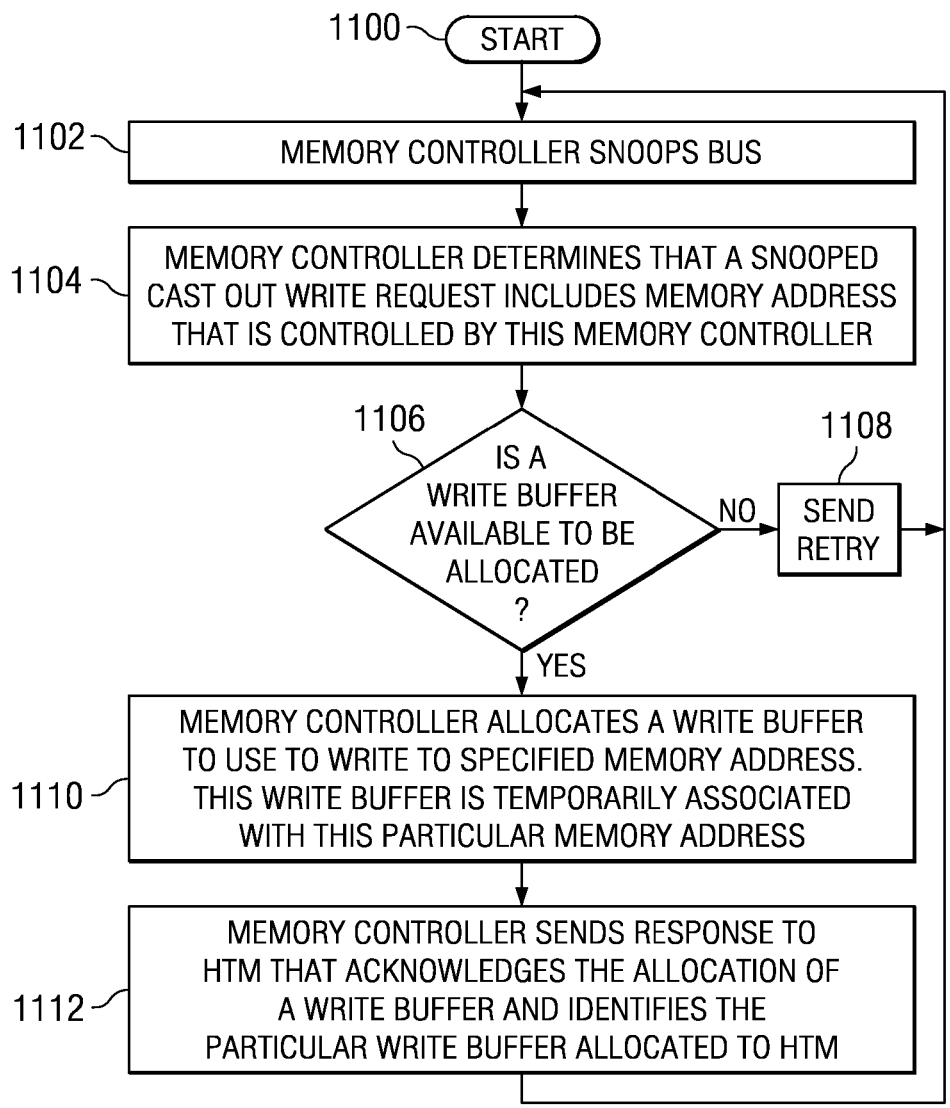
FIG. 11 illustrates a high level flow chart that depicts a system memory's memory controller allocating write buffers to use to receive trace data from a hardware trace macro in accordance with the present invention.

FIG. 11 illustrates a high level flow chart that depicts a system memory's memory controller allocating write buffers to use to receive trace data from a hardware trace macro in accordance with the present invention. The process starts as depicted by block 1100 and thereafter passes to block 1102 which illustrates the memory controller snooping the bus. Next, block 1104 depicts the memory controller determining that a snooped cast out write request includes a memory address that is controlled by this memory controller.

The process then passes to block 1106 which illustrates a determination of whether or not one of this memory controller's write buffers is currently available to be allocated. If a determination is made that none of this memory controller's write buffers are currently available to be allocated, the process passes to block 1108 which depicts the memory controller sending a retry signal to the HTM. The process then passes back to block 1102.

Referring again to block 1106, if a determination is made that one of this memory controller's write buffers is currently available to be allocated, the process passes to block 1110 which depicts the memory controller allocating a write buffer. This write buffer is allocated for use for the specified memory address that was included in the cast out request. This write buffer is associated with this particular memory address as long as the write buffer is allocated for this memory address. Next, block 1112 illustrates the memory controller sending a response to the HTM that acknowledges the allocation of a write buffer and that identifies the particular write buffer that was allocated to the HTM. This acknowledgement also identifies this particular memory controller. For example, the acknowledgement can include the memory controller number and the write buffer number. The process then passes back to block 1102.

Figure 12:
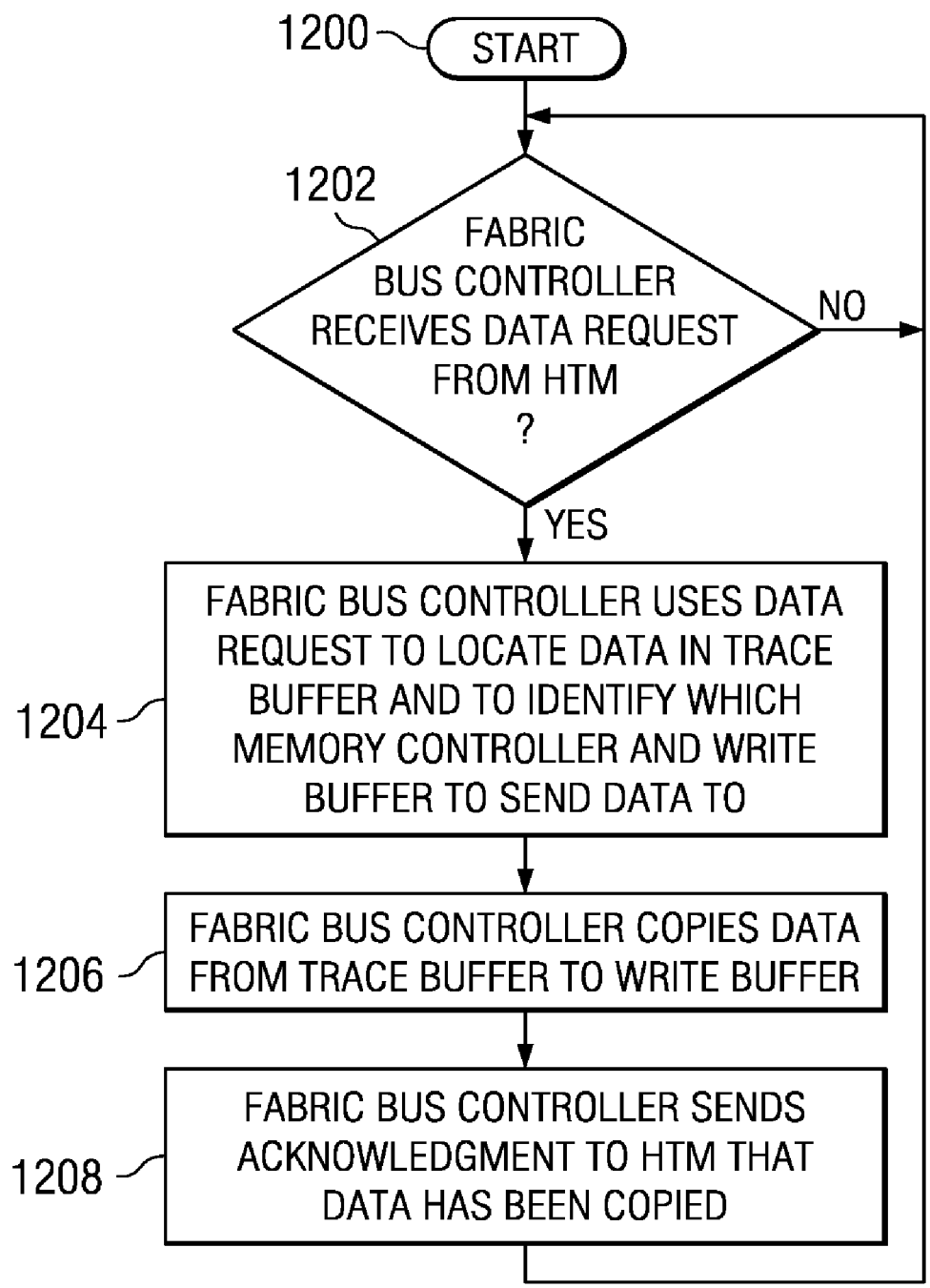
FIG. 12 depicts a high level flow chart that illustrates the fabric bus controller receiving a cast out data request and in response to receiving the cast out data request copying the trace data from the hardware trace macro to write buffers allocated to the hardware trace macro in accordance with the present invention.

FIG. 12 depicts a high level flow chart that illustrates the fabric bus controller receiving a cast out data request and in response to receiving the cast out data request copying the trace data from the hardware trace macro to write buffers allocated to the hardware trace macro in accordance with the present invention. The process starts as depicted by block 1200 and thereafter passes to block 1202 which illustrates a determination of whether or not the fabric bus controller has received a cast out data request from the hardware trace macro. If a determination is made that the fabric bus controller has not received a cast out data request from the hardware trace macro, the process passes back to block 1202. If a determination is made that the fabric bus controller has received a cast out data request from the hardware trace macro, the process passes back to block 1204 which depicts the fabric bus controller using the cast out data request to locate the data in the trace buffer and to identify which memory controller and write buffer to send the data to.

The cast out data request includes the address in the trace buffer where the data is located. The cast out data request also includes routing information in the form of a tag from the Dtag buffer. The tag from the Dtag buffer includes a memory controller identifier, such as a memory controller number, and a write buffer identifier, such as a write buffer number. Thus, the tag from the Dtag buffer can be used to locate a particular memory controller and then a particular write buffer.

The process then passes to block 1206 which depicts the fabric bus controller copying the data from the trace buffer that is included in the HTM to the write buffer that was identified in the cast out data request. Next, block 1208 illustrates the fabric bus controller sending an acknowledgement to the HTM that the data has been copied. The process then passes back to block 1202.

Figure 13:
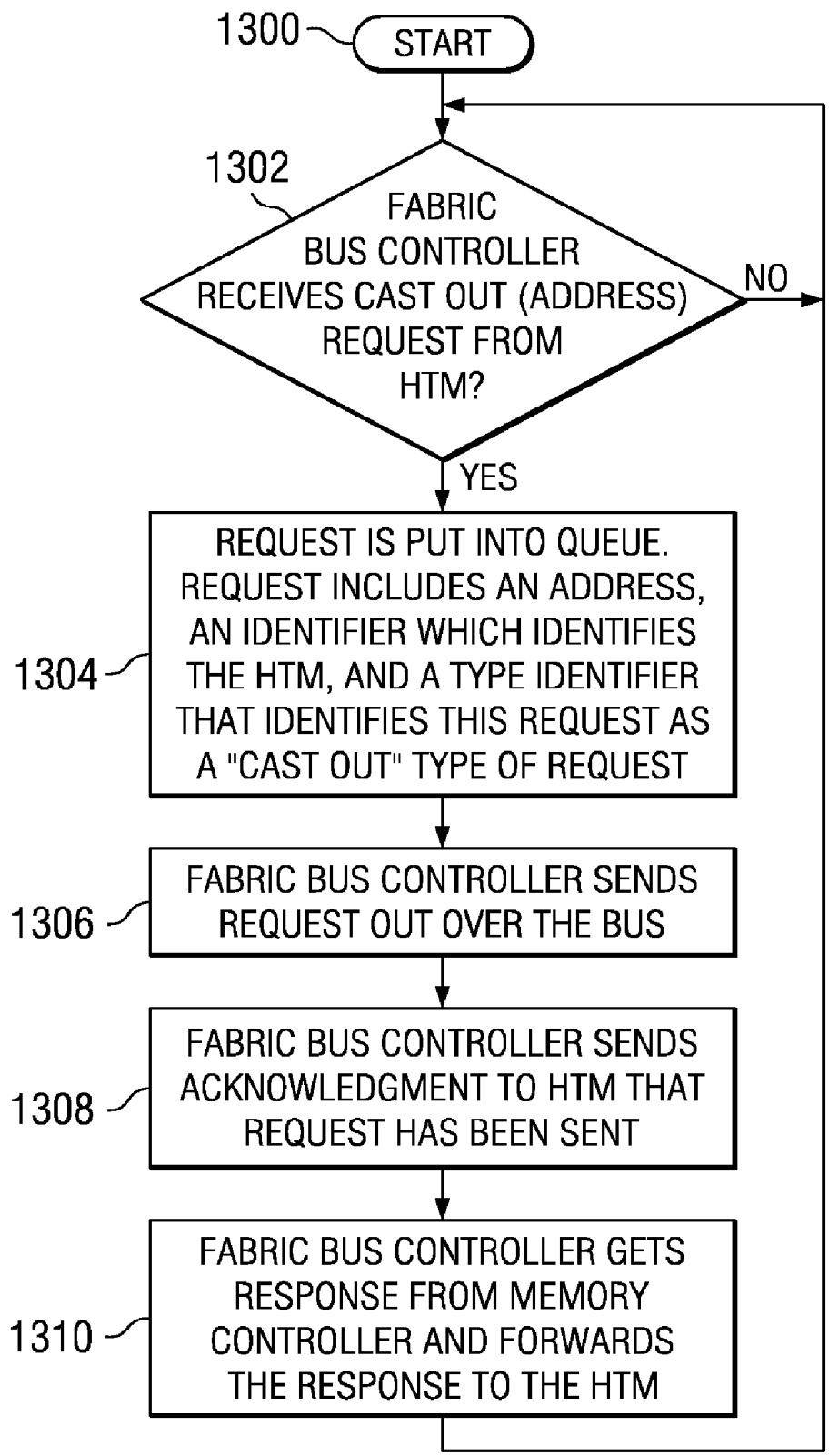
FIG. 13 illustrates a high level flow chart that depicts the fabric bus controller receiving an address request, such as a cast out address request, and in response to receiving the address request sending the address request out over the bus in accordance with the present invention.

FIG. 13 illustrates a high level flow chart that depicts the fabric bus controller receiving an address request, such as a cast out request, and in response to receiving the address request sending the address request out over the bus in accordance with the present invention. The process starts as depicted by block 1300 and thereafter passes to block 1302 which illustrates a determination of whether or not the fabric bus controller has receiving an address request, such as a cast out address request, from the hardware trace macro (HTM). If a determination is made that the fabric bus controller has not received an address request, the process passes back to block 1302. If a determination is made that the fabric bus controller has received an address request, the process passes to block 1304 which depicts the request being put into a queue (not shown) in the fabric bus controller. The request includes an address, an identifier which identifies the HTM, and a type that identifies this request as being a "cast out" type of request.

The process then passes to block 1306 which illustrates the fabric bus sending the request out over the bus. Thereafter, block 1308 depicts the fabric bus controller sending an acknowledgement to the HTM that the request has been sent. Block 1310, then, illustrates the fabric bus controller getting a response from the memory controller and forwarding that response to the HTM. The process then passes back to block 1302.

Figure 14:
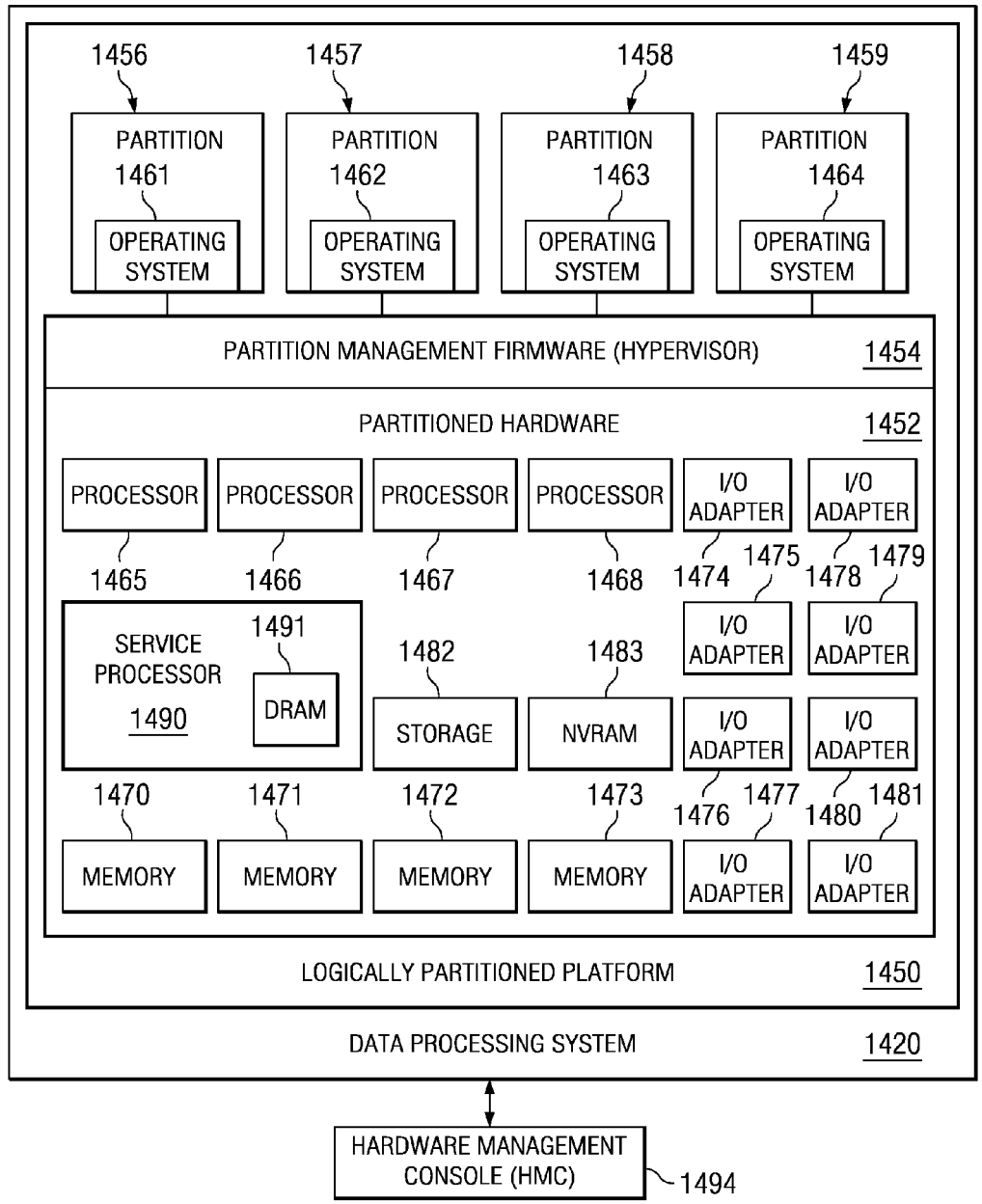
FIG. 14 is a block diagram of a logically partitioned platform that includes the present invention in accordance with the present invention.
Figure 16:
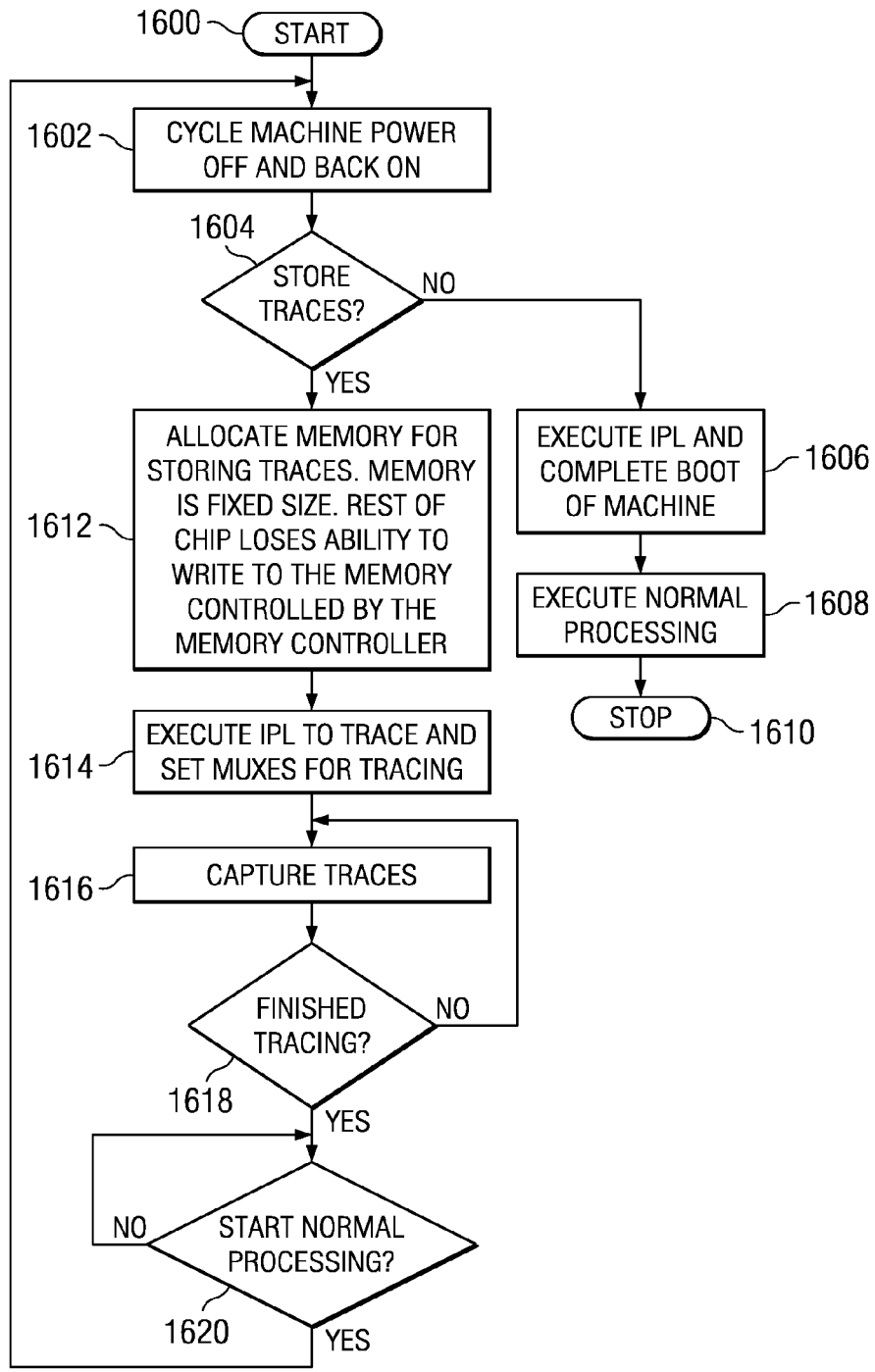
FIG. 16 depicts a high level flow chart that illustrates booting a prior art system in a trace mode so that tracing can be performed and the trace data saved in accordance with the prior art.

FIG. 14 is a block diagram of a logically partitioned platform that includes the present invention in accordance with the present invention. The present invention may be included within a system such as the one depicted by FIG. 14.

Data processing system 1420 includes logically partitioned platform 1450. Platform 1450 includes partitioned hardware 1452, partition management firmware, also called a hypervisor 1454, and partitions 1456-1459. Operating systems 1461-1464 exist within partitions 1456-1459. Operating systems 1461-1464 may be multiple copies of a single operating system or multiple heterogeneous operating systems simultaneously run on platform 1450.

Partitioned hardware 1452 includes a plurality of SMT-capable processors 1465-1468, a plurality of system memory units 1470-1473, a plurality of input/output (I/O) adapters 1474-1481, and a storage unit 1482. Each of the processors 1465-1468, memory units 1470-1473, NVRAM storage 1483, and I/O adapters 1474-1481 may be assigned to one of multiple partitions 1456-1459. Partitioned hardware 1452 also includes service processor 1490. A non-volatile memory device 1491, such as an NVRAM device, is included within service processor 1490.

Partition management firmware (hypervisor) 1454 performs a number of functions and services for partitions 1456-1459 to create and enforce the partitioning of logically partitioned platform 1450. Hypervisor 1454 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 1454 allows the simultaneous execution of independent OS images 1461-1464 by virtualizing all the hardware resources of logically partitioned platform 1450. Hypervisor 1454 may attach I/O devices through I/O adapters 1474-1481 to single virtual machines in an exclusive mode for use by one of OS images 1461-1464.

A hardware management console (HMC) 1494 may be coupled to service processor 1490 in data processing system 1420. HMC 1494 is a separate computer system that is coupled to service processor 1490 and may be used by a user to control various functions of system 1420 through service processor 1490.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing in-memory hardware tracing using an existing first system bus in a data processing system, said data processing system including a first processor that includes a first plurality of processing units coupled together utilizing said first system bus, said first plurality of processing units including a first memory controller coupled to the first system bus that controls a first system memory, said data processing system also including a second processor that includes a second plurality of processing units coupled together utilizing a second system bus, said second plurality of processing units including a second memory controller coupled to the second system bus that controls a second system memory, said method comprising:

transmitting information among said first and second plurality of processing units utilizing said first and second system buses when said first and second processors are in a normal, non-tracing mode, said information being formatted according to a standard system bus protocol, wherein said first and second system buses are coupled together;

selecting a trace that generates hardware trace data, said trace being a particular type;

determining a bandwidth for said particular type;

determining a number of a plurality of write buffers that are needed in order to accommodate said bandwith;

dynamically allocating said number of said plurality of write buffers to a hardware trace facility for storing said hardware trace data, wherein said plurality of write buffers are in said second processor and are external to said second system memory, wherein said plurality of write buffers are connected directly to said second system bus, and further wherein said second memory controller is connected directly to said second system bus and controls said plurality of write buffers, and still further wherein said hardware trace data is written from said ones of said plurality of write buffers to said second system memory without said hardware trace data being transmitted through another device;

capturing said hardware trace data utilizing said hardware trace facility that is located in said first processor and that is connected directly to said first system bus, wherein information is transmitted directly between said hardware trace facility and said first system bus without being transmitted through another device; and transmitting, utilizing said first system bus, said hardware trace data to said second memory controller for storage in said second system memory, said second memory controller being coupled directly to said second system bus, said hardware trace data being formatted according to said standard system bus protocol for transmission via said second system bus.

2. The method according to claim 1, further comprising:

transmitting standard, non-trace information on said first and second system buses from ones of said first and second processing units using a cast out mechanism that formats said standard information according to said standard system bus protocol; and transmitting said hardware trace data on said first and second system buses using said cast out mechanism that formats said hardware trace data according to said standard system bus protocol.

3. The method according to claim 1, further comprising:

said first plurality of processing units including a first cache controller and a first plurality of memory controllers that includes said first memory controller; and said second plurality of processing units including a second cache controller and a second plurality of memory controllers that includes said second memory controller.

4. The method according to claim 1, further comprising:

generating a request, by said hardware trace facility, for allocation of a particular size of said second system memory to use for storing said hardware trace data; and indicating said request, by said hardware trace facility, using a register bit.

5. The method according to claim 4, further comprising:

allocating particular locations within said second system memory for storing said hardware trace data, all of said particular locations together being said particular size.

6. The method according to claim 5, further comprising:

receiving said hardware trace data by said second memory controller via said first and second system buses; and storing said hardware trace data in said particular locations.

7. The method according to claim 4, further comprising:

receiving, by said hardware trace facility via said register bit, an acknowledgement that said particular size of said second system memory has been allocated.

* * * * *